United States Patent
Ma

(10) Patent No.: US 12,354,029 B2
(45) Date of Patent: Jul. 8, 2025

(54) DYNAMIC WEBSITE CONTENT OPTIMIZATION

(71) Applicant: Zeta Global Corp., New York, NY (US)

(72) Inventor: Ning Ma, New York, NY (US)

(73) Assignee: Zeta Global Corp., New York, NY (US)

( * ) Notice: Subject to any disclaimer, the term of this patent is extended or adjusted under 35 U.S.C. 154(b) by 856 days.

(21) Appl. No.: 15/879,351

(22) Filed: Jan. 24, 2018

(65) Prior Publication Data

US 2019/0228105 A1 Jul. 25, 2019

(51) Int. Cl.
| | |
|---|---|
| *G06N 7/01* | (2023.01) |
| *G06F 16/951* | (2019.01) |
| *G06F 16/957* | (2019.01) |
| *G06F 40/134* | (2020.01) |
| *G06F 40/197* | (2020.01) |
| *H04L 67/50* | (2022.01) |

(52) U.S. Cl.
CPC .............. *G06N 7/01* (2023.01); *G06F 16/951* (2019.01); *G06F 16/9577* (2019.01); *G06F 40/134* (2020.01); *G06F 40/197* (2020.01); *H04L 67/535* (2022.05)

(58) Field of Classification Search
None
See application file for complete search history.

(56) References Cited

U.S. PATENT DOCUMENTS

| | | | | |
|---|---|---|---|---|
| 8,495,143 | B2 * | 7/2013 | Zhou ..................... | G06Q 30/02 |
| | | | | 705/14.66 |
| 8,578,010 | B2 * | 11/2013 | Branson ................. | H04L 67/22 |
| | | | | 709/223 |
| 10,943,217 | B1 * | 3/2021 | Rozin ................... | G06Q 20/108 |
| 2008/0313119 | A1 * | 12/2008 | Leskovec .............. | G06F 16/951 |
| | | | | 706/46 |
| 2009/0204638 | A1 * | 8/2009 | Hollier .................. | G06F 16/951 |

(Continued)

OTHER PUBLICATIONS

Fan Wu, I-Han Chiu and Jiunn-Rong Lin, "Prediction of the intention of purchase of the user surfing on the Web using hidden Markov model," Proceedings of ICSSSM '05. 2005 International Conference on Services Systems and Services Management, 2005., Chongquing, China, 2005, pp. 387-390 vol. 1 (Year: 2005).*

(Continued)

*Primary Examiner* — Abdullah Al Kawsar
*Assistant Examiner* — Asher H. Jablon
(74) *Attorney, Agent, or Firm* — Schwegman Lundberg & Woessner, P.A.

(57) ABSTRACT

A system presents content to a website user based on a predicted future intent of the user. Hidden Markov models (HMMs) are developed based on a hierarchical and relational graph of a website. Given a sequence of observed actions performed by a user on the website, a HMM can be used to predict a likely intent the user has most recently acted on. Using a deterministic algorithm or a Monte Carlo Tree Search algorithm, the system can then predict likelihoods that each possible user intent associated with the website is a future intent of the particular user. Website content and formatting can be adjusted based on predictions about a user's future intents.

12 Claims, 6 Drawing Sheets

(56) References Cited

U.S. PATENT DOCUMENTS

| | | | | |
|---|---|---|---|---|
| 2010/0250529 | A1* | 9/2010 | Surendran | G06Q 30/02 |
| | | | | 715/745 |
| 2011/0119220 | A1* | 5/2011 | Seolas | G06F 40/143 |
| | | | | 706/47 |
| 2014/0136536 | A1* | 5/2014 | Ramsey | G06F 16/248 |
| | | | | 707/733 |
| 2014/0201618 | A1 | 7/2014 | Hansmann et al. | |
| 2014/0372901 | A1* | 12/2014 | Catlin | G06Q 30/0251 |
| | | | | 715/745 |
| 2015/0269609 | A1* | 9/2015 | Mehanian | G06Q 30/0254 |
| | | | | 705/14.45 |
| 2015/0302105 | A1 | 10/2015 | Dicker et al. | |
| 2016/0239897 | A1* | 8/2016 | Ghose | H04L 67/02 |
| 2016/0248644 | A1* | 8/2016 | Dontcheva | H04L 67/02 |
| 2017/0011419 | A1* | 1/2017 | Cai | G06Q 30/0253 |
| 2017/0300966 | A1* | 10/2017 | Dereszynski | G06Q 30/0254 |
| 2019/0065978 | A1* | 2/2019 | Martine | H04L 67/535 |

OTHER PUBLICATIONS

J. Kiseleva, H. T. Lam, M. Pechenizkiy and T. Calders, "Predicting Current User Intent with Contextual Markov Models," 2013 IEEE 13th International Conference on Data Mining Workshops, Dallas, TX, 2013, pp. 391-398 (Year: 2013).*

Ye et al. "What's your next move: User activity prediction in location-based social networks." 2013. In Proceedings of the 2013 SIAM International Conference on Data Mining (pp. 171-179). (Year: 2013).*

Shani et al. "An MDP-Based Recommender System." Journal of Machine Learning Research, vol. 6, pp. 1265-1295 (Year: 2005).*

Silver et al. "Monte-Carlo planning in large POMDPs." 2010. Advances in Neural Information Processing Systems 23. pp. 1-9 (Year: 2010).*

* cited by examiner

210A Homepage > Credit Cards

MoneyBank

Credit Cards

Personal Credit Cards

Rewards for the whole family. Find the credit card that's right for you.

220A MoneyBank Guardian
Earn cash back for grocery purchases, school supplies, and more.

220B Cruise Line Rewards
Earn 1 point for every $1.

| | |
|---|---|
| 220C | Popular Cards for Parents |
| 220D | Mortgage |
| 220E | 529 Plans |

220F Savings – Tips and Tricks
How to cut your children's allowance without them noticing...

FIG. 2A

210B Homepage > Credit Cards

MoneyBank

Credit Cards

Student Friendly Credit Cards

It's your choice how you want to earn cash back after your first $700 of purchases.

220G MoneyBank Independence
Earn unlimited 1.8% cash back.

220H Book Buyer Rewards
Earn 5% cash back.

| | |
|---|---|
| 220I | More Student Credit Cards |
| 220J | Book Buy-Back Program |
| 220K | Student Loans |

220L Congrats Seniors!
Paying off your student debt before you die...

FIG. 2B

DYNAMIC WEBSITE CONTENT OPTIMIZATION

FIELD OF ART

This disclosure relates generally to website customization, and in particular to using computer models to dynamically adjust presented website content.

DESCRIPTION OF ART

Website visitors sometimes have to navigate through many linked webpages of a website to accomplish goals they have when accessing the website. For example, a user shopping for shoes on an online retail website may have to click through a succession of hyperlinks to access a webpage displaying women's, size 9, silver shoes, with a ½ inch heel. Such website navigation can be tedious and can waste time when a user accesses a website with a specific intent.

Furthermore, users in some situations may have only a vague idea of what they are looking for when they access a website. For example, a user may access an online retailer website with a goal only to browse whatever products might be available. However, since websites tend to present the same information to all visiting users, it can be difficult for a user to quickly access information that is personally relevant.

SUMMARY

An online system allows a website to be personalized according to the attributes and intents of specific visiting users. Hidden Markov models may be used to model transitions between user intents that are possible in view of the structure of the website. The online system develops probability distributions that are generally applicable to groups of website users and the online system can also develop customized probability distributions that account for particular user attributes and website interaction sequences. A Hidden Markov model structure uses three kinds of probability distributions: a transition probability distribution, an emission probability distribution, and an initial probability distribution.

When a user accesses the website the three different types of probability distributions for that website are loaded into the Hidden Markov model structure. Values of each of the three probability distributions may be selected for a particular user based on the amount and type of data the online system has stored about past visits by the particular user to the website. As the user progressively interacts with the website, user actions are provided to the online system. The progressively growing sequence of such user actions is provided as it grows as input to the Hidden Markov model, which is used to determine a succession of a likely sequence of user intents that the user had while interacting with the website. Using this information, the online system can predict a likely current user intent (e.g., the last intent in the determined likely sequence).

Based on the predicted current user intent, the online system predicts a next user intent, a future user intent, or a likely sequence of user intents. In particular, a Monte Carlo Tree Search algorithm or another similar deterministic algorithm may be applied to the transition structure of the Hidden Markov model, starting with the determined likely current user intent.

The online system uses the predicted information about future user intents to determine what content should be provided to the user. The website's content may thus be partially or wholly dynamic in that some graphic elements of each webpage may be reserved for content that is the same for all users, while other screen elements may be dynamically chosen based on the predicted information about a user's intent. For example, the online system can provide a link to from a webpage the user is currently viewing to a webpage that includes content related to a predicted future user intent. The online system can also change the way that content items on the website are displayed for the user based on feedback about the user's responses to content that is provided in view of a predicted user intent. In these ways, online system improves the efficiency and usability of the website for the user.

BRIEF DESCRIPTION OF THE DRAWINGS

FIG. 2A is an illustration of an example user interface with content based on a predicted user intent.

FIG. 2B is an illustration of another example user interface with content based on a predicted user intent.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Data collected about website use can be used to better understand website audiences. In many cases, information about user attributes, which may be stored in cookies, for example, is used to target content and advertisements for individuals who access a website. However, existing systems predict user actions only by monitoring and modeling the frequency of such attributes. By observing sequences of user actions, the system described herein makes it possible to dynamically generate webpage with content chosen for presentation based on user's predicted intent.

A user's "intent" is a motive or objective the user has when visiting a website. As several examples, a user may access a bank website with the intent of paying off a bill on a credit card, a user may access a sporting goods website with the intent of browsing the shoe selection, and a user may visit a city website with the intent of viewing the local events schedule. It is also possible that a user has multiple intents when visiting a website. Furthermore, a user may have separate intents when visiting different websites. Although a user's intent is not observable (it is an idea in the user's head and thus may not be explicitly accessible to an online system), the user's actions on a website are observable. The system described herein uses Hidden Markov models (HMMs) to determine likely user intents based on observed sequences of user interactions with one or more websites. The system can dynamically select webpage content based on the predicted intents of the user, helping users access relevant content more easily and efficiently by requiring less navigation and interaction of the website as a whole.

System Architecture

Figure 1:
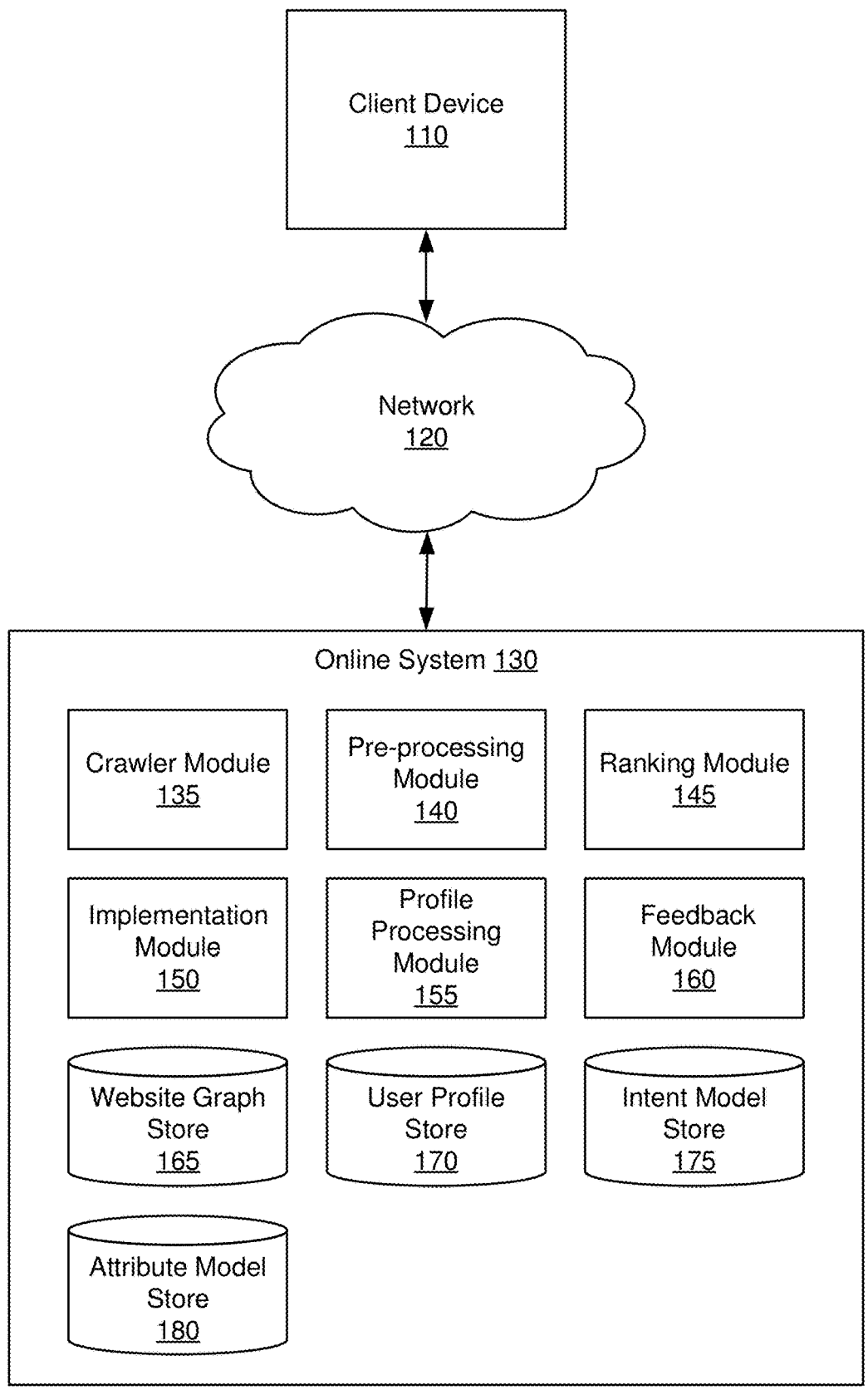
FIG. 1 illustrates a system architecture for an online system.

FIG. 1 illustrates a system architecture for an online system. FIG. 1 includes a client device 110, a network 120, and the online system 130. Alternate embodiments of the system environment can have any number of client devices 110 as well as multiple online systems 130.

The online system 130 can adjust website content for a user based on past and present behavior of the user and of other users. The online system 130 uses information about prior sequences of actions taken by the user on the website, user profile information, priorities and preferences of a website administrator, and other data to develop probability distributions for one or more Hidden Markov models (HMMs). The HMMs are used to determine likely sequences of intents the user has when interacting with the website. When a user interacts with the website, for example by accessing a home page, a set of probability distributions associated with the user is loaded into a HMM as a part of predicting a likely next intent or sequence of next intents of the user. The online system 130 can adjust presentation of website content for the user accordingly.

A user may interact with the online system 130 via a client device 110, for example, by accessing a website that uses the online system 130 for content optimization. A client device 110 may be a smart phone, tablet computer, laptop computer, personal computer, or other device that may be used to access a website, for example via a web browser. Examples of web browsers include Firefox™, Chrome™, and Internet Explorer™.

A client device 110 may interact with the online system 130 via a network 120, which may include any combination of local area and wide area networks employing wired or wireless communication links. In some cases, all or some of the communications on the network 120 may be encrypted.

The online system 130 comprises a crawler module 135, a pre-processing module 140, a ranking module 145, an implementation module 150, a profile processing module 155, a feedback module 160, a website graph store 165, a user profile store 170, an intent model store 175, and an attribute model store 180.

The crawler module 135 collects information about a website, for use by the online system 130. The crawler module 135 automatically traverses the website via hyperlinks, for example, starting from a homepage of the website. While traversing the website, the crawler module 135 creates a hierarchical and relation graph data structure representing the organization of the hyperlinks and additional information about each page of the website. Thus the crawler module receives information about the architecture of the website (e.g., a graph of interactive components of the website). The website graph and accompanying information is stored in the website graph store 165. The crawler module may periodically repeat a website traversal to capture any changes to the website content or structure over time.

The information logged by the crawler module 135 may also include information about possible observable actions that a user can take within each page of the website. For example, a user may be able to view different information within a webpage by hovering a mouse pointer over a component of the webpage and the hovering action may be logged by the online system 130.

The crawler module 135 categorizes each of the webpages and each action on a webpage according to possible user intents associated with the actions and webpages. For example, accessing a webpage displaying shoes may be categorized as "browse shoes" and the action of clicking on a button for submitting an order may be categorized as "make purchase." In some cases, such categorization of observable user actions as relating to intents may be performed manually by a system administrator of the online system 130.

The pre-processing module 140 manages training and preparation of the online system 130. The pre-processing module 140 generates state graphs for HMMs and generates probability distributions (i.e., transmission probability distributions, emission probability distributions, and initial probability distributions) to apply to the state graphs in different situations. The HMMs and accompanying probability distributions are generated using training data from the website graph store 165, user profile data from a user profile store 170, and additional information about training preferences which may be supplied to the online system 130 by a system administrator. In some cases, the pre-processing module 140 additionally trains machine models to identify statistically significant correlations between user attributes and certain intents that a user is likely to have when interacting with a website. The models are trained using data obtained from user interactions with websites. Data about how one or more users access and interact with a website may be obtained in various ways.

One way that website information may be obtained is via use of bidding requests in which a demand-side platform (DSP) associated with the online system 130 stores a record of advertising bid requests over time and thus maintains logs about websites that individual users have visited. Such logs may include information about each page of a webpage on which the DSP facilitates advertising opportunities. For example, the information could include sequences in which users visit webpages within a website and an amount of time spent by each user on each page of a website.

Website data may also be obtained with website pixels. Use of a pixel involves the inclusion of a small program (e.g., representative of an invisible 1×1 pixel) within code for a webpage. The program allows the online system 130 to observe user actions (e.g., clicks, conversions, hovers, etc.) within any webpage on which the online system 130 maintains such a pixel. Information obtained in this way may include a time-stamped sequence of webpages visited by a user, and conversion data for each visit to the website.

The pre-processing module 140 uses data collected about website use to train HMMs to predict likely next intents of a user who is visiting a webpage. Models (e.g., HMMs) that are trained to predict likely user intents are stored in the intent model store 175. Models that are trained to identify intents that are associated with user attributes are stored in the attribute model store 180. Additional information about model training and the pre-processing module 140 is included in the description of FIG. 4

The ranking module 145 selects a HMM and applies the model to determine a likely current (i.e., most recently acted upon) intent of a user. Based on the predicted current user intent, the ranking module 145 determines a likely next intent of the user. In some cases, the ranking module 145 may instead determine a likely future user intent or a probably sequence of future intents of the user. Specifically, the ranking module 145 may use HMMs which use observed sequences of user actions, such as clicks, to determine a likely sequence of intents that the user had while performing the actions. To use a HMM, the ranking module 145 populates the HMM with values from probability distributions that are optimized for making predictions about a particular user or for a group of users. In some cases, the ranking module 145 may differentiate between users for whom existing records are stored (e.g., in the user profile store 170) and users who are new to a website or for whom the online system 130 has no data. After predicting a current user intent, the ranking module 145 selects a likely next user intent (or future intent) using a deterministic algorithm or a Monte Carlo Tree search which can examine possible future user intents when applied to a graph structure of an HMM. Additional details about the ranking module will be included in the description of FIG. 4. More information about the HMMs is included in the description of FIG. 3.

The implementation module 150 determines content to present to a user based on the predicted likely next intents of the user, as determined by the ranking module 145. In particular, the implementation module 150 determines what graphical interface elements to show to a user and how that content should be presented to the user. In some embodiments, the implementation module 150 may manage what content to include in dynamic components of a webpage that is shown to the user. For example, a personalized hyperlink that leads to a webpage associated with a predicted intent of the user may be shown to the user to help the user access and achieve the intent more efficiently. In another example embodiment, the implementation module 150 may redirect the user to a webpage containing content associated with the predicted intent of the user. Thus, generally, the implementation module 150 can manage how a user interacts with the architecture of a website in response to predicted user intents.

The profile processing module 155 manages the receipt and use of user profile data. User profile data may include prior browsing data as collected via a bid exchange or an advertising server log, first party browsing data, behavioral data, conversion data, and contextual data (e.g., time of day, day of week, OS, browser, device, etc.). The profile processing module 155 stores information about individual users in the user profile store 170. Furthermore, when a user accesses a website, the profile processing module 155 determines whether the online system 130 has access to enough information about the user to personalize the probability distribution values provided for use in a HMM or whether to apply more generalized models to predictions about the user until more data is available.

A user may have the option to set privacy and anonymization settings related to personal data collection. Privacy and security settings may take the form of opt in or opt out choices presented to a user. The profile processing module 155 does not collect or store user profile or activity data for users who have opted for the online system not to store personal data. In some cases, user data may also be stored by the online system 130 in an anonymized manner such that only average and aggregate user data is available for logging and analysis. Additionally, some or all information stored by the online system 130, including user profile data may be encrypted.

The feedback module 160 monitors a user response to the content presented by the implementation module 150. Data analyzed by the feedback module 160 can include information about the user's actions within the web site and bid request data about the user's subsequent access to competitor websites. Within the website, the feedback module 160 monitors whether the user interacts with the content provided by the implementation module 150 or whether the user proceeds to use traditional website navigation. This data may provide insight into how the online system 130 can be adjusted to work more effectively. For example, if a user navigates to a webpage that is associated with a predicted likely intent for that user, but does not access the webpage via the content presented by the implementation module 150, then the online system 130 may need to change the way content is presented to the user. If the user navigates to a webpage associated with a different intent from the predicted likely intent of the user, then the online system 130 may need to adjust its predictive models. In some embodiments, the feedback module 160 may also receive data about a user's intents, and about whether the online system 130 helped the user accomplish his intents efficiently, when a user completes an optional survey presented by the online system 130.

Implementation in a User Interface

FIG. 2A is an illustration of an example user interface with content based on a predicted user intent. In the example of FIG. 2A, the online system 130 has received a user's action sequence 210A of accessing a homepage of a website for a bank called MoneyBank and clicking on a link about credit cards. The online system 130 accesses user profile information about the user (e.g., the example user has attributes that are common for a parent) and also accesses the user's observed action sequence 210A to predict likely user intents. For example, the online system 130 may determine that, since the user has already accessed the homepage and the credit cards page during the example session, a likely next intent of the user is to sign up for a credit card that will reward family purchases, such as cash back for purchases of groceries and school supplies, or family cruise vacation points. The online system 130 may adjust the content of interface elements 220A to 220K based on one or more of the predicted user intents and based on stored user attributes.

To extend the example, the online system 130 may further predict one or more next intents of the user. Graphical interface elements 220A to 220K may be presented based on these predicted future intents. For example, the online system 130 may predict (as two top ranked predictions of future user intents) that after signing up for a credit card, the user is likely to want to view mortgage information, as presented in interface element 220D, and that the user may to want to start a 529 plan to start a college fund, as presented to the user in interface element 220E.

FIG. 2B is an illustration of another example user interface with content based on a predicted user intent. Like the user in FIG. 2A, the user in the example of FIG. 2B has performed an observed action sequence 210B of accessing the MoneyBank homepage and clicking on a link about credit cards. However, because of user profile data about attributes and past action sequences 210 of the user in FIG. 2B, the online system 130 may populate interface elements 220A to 220K with different content (e.g., credit cards for students). Additionally, the online system 130 may predict different future intents for the user of FIG. 2B. For example, in FIG. 2B, the online system 130 predicts that some of the user's next intents include selling textbooks, and viewing taking out a student loan, as represented by interface elements 220J and 220K respectively. Although the users in FIGS. 2A and 2B performed the same action sequences 210, the online system 130 presents each with different content based on predicted intents of the individuals.

Hidden Markov Models

Figure 3:
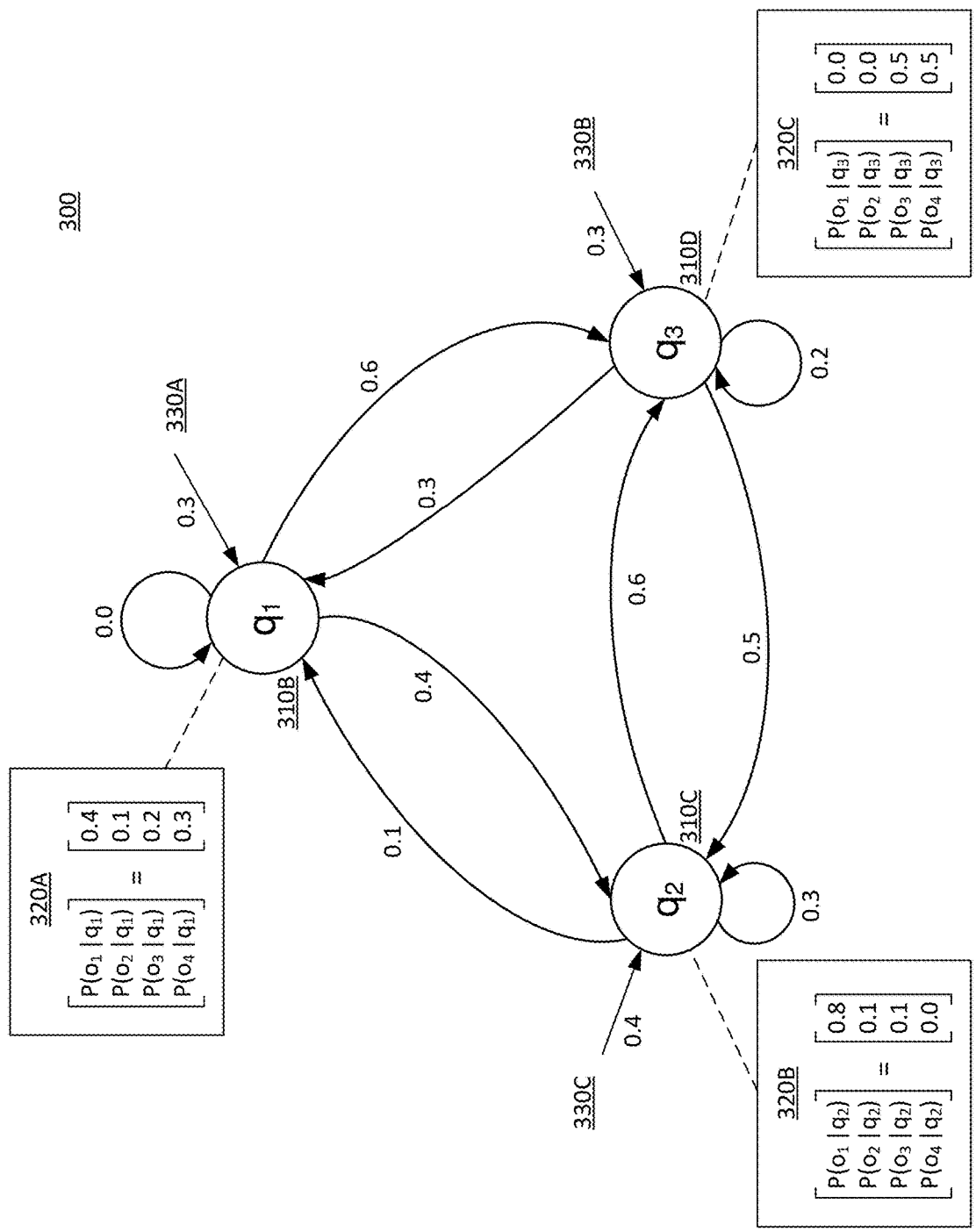
FIG. 3 illustrates a representation of an example Hidden Markov model loaded with transition probabilities, emission likelihoods, and initial probabilities.

FIG. 3 illustrates a representation of an example Hidden Markov model loaded with transition probabilities, emission likelihoods 320, and initial probabilities 330. The online system 130 uses HMMs to predict sequences of intents a user had while interacting with a website. The example HMM includes a set of hidden states 310 represented by circular nodes in a graph and labeled $q_1$, $q_2$, and $q_3$. In a HMM, the states 310 represent hidden (i.e., unobservable) information. In the case of the online system 130 each state 310 represents a possible user intent. For example, a state 310 may represent a user's intent to browse sale items on the website. Another example state 310 may represent a user's intent to apply for a credit card.

In a HMM, hidden states 310 are associated with sets of observation likelihoods 320 (also sometimes called "emission probabilities"). An observation likelihood is a probability of a particular observation being generated from a state 310. Observations are represented in FIG. 3 by the variable "o". As an example of observations relating to hidden states 310, a user action of clicking on a link to a careers page of a website (an observable action) may be associated with a user intent (a hidden state 310) of applying for a job, with some probability.

Transition probabilities, shown in FIG. 3 as values associated with directed edges between hidden states 310, represent probabilities of a user transitioning from one intent to another intent. For example, a user with a first intent of browsing available shoes on a website may have a high probability of intending to view his shopping cart next. Thus, a HMM can model likely sequences of user intents, and the likelihood of a particular sequence of intents can be predicted based on the transition probabilities and associated sets of observation likelihood values 320.

A HMM may also incorporate an initial probability distribution that represents a probability that for each hidden state the state is the first state in a sequence of user intents. Initial probabilities 330 are represented in FIG. 3 as arrows that end at nodes representing states 310, but that do not originate from another node. It can also be possible for a HMM to have starting and ending states in lieu of initial probabilities 330 for each state 310. In some embodiments, initial probability distribution values may be retrieved for use along with the transition and emission probability distribution values from the intent model store 175. In another embodiment, initial probability values may be determined at the time a user accesses a website using machine models trained to generate the initial probability values given user attribute data.

The online system 130 uses HMMs to predict a sequence of one or more user intents that the user, by performing a sequence of observable actions, has already acted on. As a user interacts with a website, the online system 130 monitors the actions of the user. That is, the online system 130 identifies a sequential order in which the user interacts with the system in an observable way (e.g., as detected via a pixel fire).

Given the observation sequence, the online system 130 uses the Viterbi algorithm, or a variation thereof, to determine a most likely current state of the user. Given a HMM with loaded probability distributions and a sequence of observations, the Viterbi algorithm determines a most likely sequence of hidden states that were associated with the observations. The online system 130 can interpret the last hidden state in the resulting sequence of hidden states as the most recent intent the user acted on. Variations of the Viterbi algorithm may assign a likelihood value to each hidden state in the HMM, each value indicating a probability that the state 310 represents the most recent intent the user acted on. With such a prediction of the likely most recent intent of the user, the online system 130 can determine a likely next user intent or sequence of likely future intents.

Component Interactions

Figure 4:
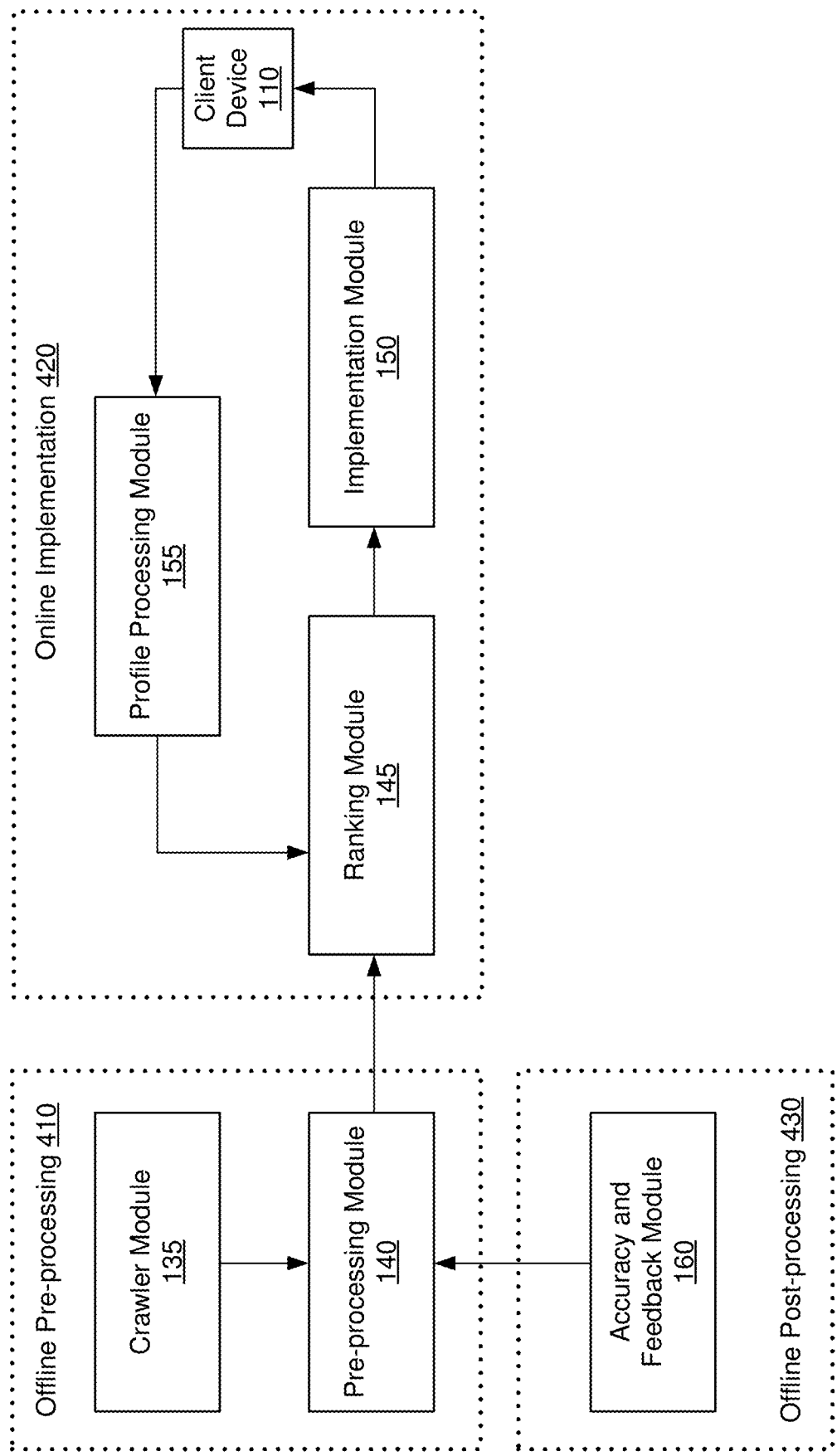
FIG. 4 is a high-level block diagram illustrating interactions between components of the online system.

FIG. 4 is a high-level block diagram illustrating interactions between components of the online system 130. The crawler module 135 and the pre-processing module 140 operate during offline pre-processing 410. As described previously, the crawler module 135 and the pre-processing module 140 collect data about a website and train HMMs and probability distributions that can be used to predict likely future intents of a user who accesses the website.

The pre-processing module 140 develops initial, transition, and emission probability distributions for HMMs. Previously logged user sessions are organized into sequences of observed actions. These user sessions may include sequences of all observable user actions that occurred (e.g., clicks, hovers, conversions, etc.) or the user sessions used for training may be limited to sequences of certain types of actions (e.g., only clicks on links). These user sessions are provided as input to an implementation of the Baum-Welch algorithm which iteratively develops transition probabilities and observation likelihoods given an observation sequence and a set of possible hidden states 310. The states present in a HMM may be determined by a system administrator, or may be determined automatically based on a list of possible user intents associated with a website.

A variety of probability distributions may be generated for a website to be loaded into a HMM in different situations. For example, the set of probability distributions that are loaded into a HMM may depend on how much user profile data the online system 130 has stored about a user accessing a website. The pre-processing module 140 may train all three types of probability distributions to be based on observation sequences from all users, observation sequences from a particular classification of users, and based on sequences of observable actions performed by individual users. Additionally, the pre-processing module 140 may use models trained with user attribute data to generate probability distribution values for subgroups of users. In these ways, the online system 130 can store HMM probability distributions that are customized for repeat users of a website and that are generalized for users who have never visited the website before.

The profile processing module 155, ranking module 145, and implementation module 150 operate during online implementation 420. When a user accesses a website, the profile processing module 155 determines what data about the user is available to the online system 130. If the user has visited the website before, or if the user has visited other websites that are associated with the online system 130, the profile processing module 155 can access a user profile of the user stored in the user profile store 170. A user profile may include user attribute data which may include information about the user's browsing history, sequences of actions taken by the user on websites, the user's conversion history, a history of content that was shown to the user, user preferences, and other information about the user (e.g., favorite colors, favorite activities, age, place of work, etc.). Data collected by the profile processing module 155 at a time when a user accesses a website may also include contextual data such as time of day, day of week, operating system, browser, device, and so on. If the user profile store 170 does not have an existing user profile with the online system 130, the profile processing module 155 may create a user profile for the user, and begin populating it with user data. In the meantime, since the online system has little or no data for such a new user, the profile processing module 170 may determine whether any user attribute information is available for the user via a cookie associated with the user.

The ranking module 145 selects transition, emission, and initial probability distributions, and loads them into the HMM. The particular probability distributions used by the ranking module 145 to populate a HMM model for a particular user depends of the user profile information collected by the profile processing module 155 for that user. For a user with no existing cookie and no profile on the online system 130 the ranking module 145 may select transition, emission, and initial probability distributions that were generated based on a combination of user data from multiple past users of the website. If the user does not have an existing user profile stored in the user profile store 170, but the user does have a cookie with data about user attributes, then the ranking module 145 may select an initial probability distribution based on the user attributes, for example, using a machine model that is trained to select initial probabilities given user attribute values. A model of this kind may be stored in the attribute model store 180, for example. In some cases, the online system 130 may also classify the user according to predetermined user categories, and assign emission and transition probabilities that were generated using logged user behaviors of past users of the determined user category. If a user has an existing user profile in the user profile store 170, the ranking module can load transition, emission, and initial probability distributions that are generated using user-specific data into the HMM.

Transition, emission, and initial probabilities can also be affected by preferences set by an administrator of the online system 130. For example, to predict more specific user intentsand to direct a user toward content-specific webpages, the online system may be configured to use a Bakis-style HMM structure in which transitions only exist in one directions between hidden states. Using the Bakis-style HMM structure causes the online system 130 to direct users toward more specific areas of a website. The directed transitions in such an embodiment restrict algorithms that use this type of HMM to only predicting future user intents that have more focus than initial user intents. For example, an online system 130 using Bakis-style HMMs may never predict that a user's future intent is to go to the homepage of the website. This may help a user access specific webpages more quickly.

The ranking module 145 applies the Viterbi algorithm (or a variation thereof) to the HMM to determine a most recent intent of the user. Based on the determined most recent user intent, the ranking module 145 determines one or more likely next intents of the user, or may determine one or more likely future sequences of user intents. To predict future user intents, the ranking module 145 uses a deterministic algorithm, a Monte Carlo Tree Search algorithm, or another similar algorithm on the HMM graph, using the predicted most recent user intent as the starting node. The predicted future intents may be ranked based on their likelihoods.

In one embodiment, the predicted future intents may additionally or alternatively be ranked based on user attributes associated with different user intents. For example, the ranking module 145 may use attribute models to determine which of the predicted future user intents will be most appropriate to a user in view of the attributes of the user. A user attribute model determines likely user intents given user attributes as input. A user attribute model may use a classification algorithm (e.g., decision tree, k-Nearest Neighbors, Support Vector Machine, logistic regression, neural networks, etc.) that can classify a user as being likely to have a particular intent.

The implementation module 150 manages the contents of graphical interface elements of the webpage that is presented to a user on client device 110 in view of the predicted future user intents. That is, the implementation module 150 can affect the way a user interacts with a website architecture such that the user can access webpages and content associated with predicted intents easily. The implementation module 150 may show hyperlinks, images, text, or other content based on a best guess of a user's future intent. The implementation module 150 uses information generated by the ranking module 145 to determine both what type of content to show to the user and to determine how the content can be best presented within the graphical interface elements. In one embodiment, the implementation module 150 may control a subset of dynamic graphical interface elements within webpages of the website (i.e., elements that can be changed for different users). In such an embodiment, other static graphical elements may be displayed for all users of the webpage. As one example, the implementation module 150 may include a hyperlink on a webpage the user is currently viewing that leads to a specific webpage that is associated with a predicted user intent. Such a hyperlink can allow the user to choose to bypass other intermediate webpages within the website architecture to access the webpage associated with a user intent quickly and easily. In another embodiment, the implementation module 150 may redirect a user to a webpage associated with a predicted user intent.

The implementation module 150 uses a ranking of the likely next intents of the user to determine what content to present to the user. The order of appearance or size of content items may be based on such a ranking. For example, if a user is predicted to be likely to have a next intent of browsing sale items, and if the user is also predicted to be almost as likely to want to view his shopping cart next, the implementation module may include both options in a list with a link to the sales webpage appearing first and a link to the user's shopping cart appearing second, and so on. In some cases, content related to only a certain number of the most highly ranked likely next user intents is presented to a user. For example, only the top three most likely next user intents may be presented as links.

Other considerations may also affect how the implementation module 150 presents content to a user. An administrator of the online system 130 may define a threshold value for the intent likelihoods, such that all user intents that are determined by the ranking module 145 to have at least such a likelihood of being the user's next intent may be represented by content that is presented to the user. Similarly, a system administrator may provide additional configuration instructions that affect the sizing and ordering of website content in conjunction with considerations related to predicted next user intents. The implementation module 150 may affect different aspects of a website including specific images, specific links (e.g., suppressing or promoting certain links based on system administrator defined preferences), ordering of content, changing fonts, formatting content in a particular way, offering personalized incentives, customizing the HTML, CSS, and JS of the webpage, and so forth. The implementation module 150 provides content and instructions for content presentation to the client device 110.

As a user interacts with a website, observable actions are added to an observation sequence. The updated sequence of observations can then be re-applied by the ranking module 145 to determine additional future intents of the user. As is shown in FIG. 4, the process of updating the observation sequence to include a new user action, using the updated observation sequence as input to a HMM to determine a likely current user intent, applying a deterministic or Monte Carlo Tree search algorithm to the states of the HMM starting with a likely current user intent to predict a future user intent, and presenting content to the user at the client device 110 based on the predicted future user intent can be repeated cyclically while the user continues to interact with the website.

The feedback module 160 operates during offline post-processing 430. The feedback module 160 monitors user responses to content that was implemented by the implementation module 150 and can provide feedback to the preprocessing module 140 for use in retraining machine models. Depending on user responses to content that was provided by the implementation module 150, the feedback module 160 may also recommend adjustments to probability distribution values for loading into HMMs. The feedback module may also adjust values used by the implementation module 150 to determine how content is presented. If a user navigates to an intent that was predicted for that user, but the user does not interact with the content provided by the implementation module 150 to complete the intent, the feedback module 160 may alter values related to how content is presented to that user. For example, the feedback module 160 might add information to the user's profile indicating content formats with which the user is most likely to interact. If a user's observed actions indicate that the user did not act on the predicted user intent during his time on the website, the feedback module 160 may adjust the weights of probability distributions for that user, to better predict the user's intent in the future.

If the online system 130 is implemented on multiple websites, the online system 130 may receive data about a user's actions on both websites and adjust probability distribution values for the user for each website accordingly. For example, if a user is predicted to have an intent of purchasing shoes on a first website, but the user then navigates to a competitor website and purchases shoes there instead, the feedback module 160 may adjust values that affect intent prediction and content implementation for the user in the first website.

Process Overview

Figure 5:
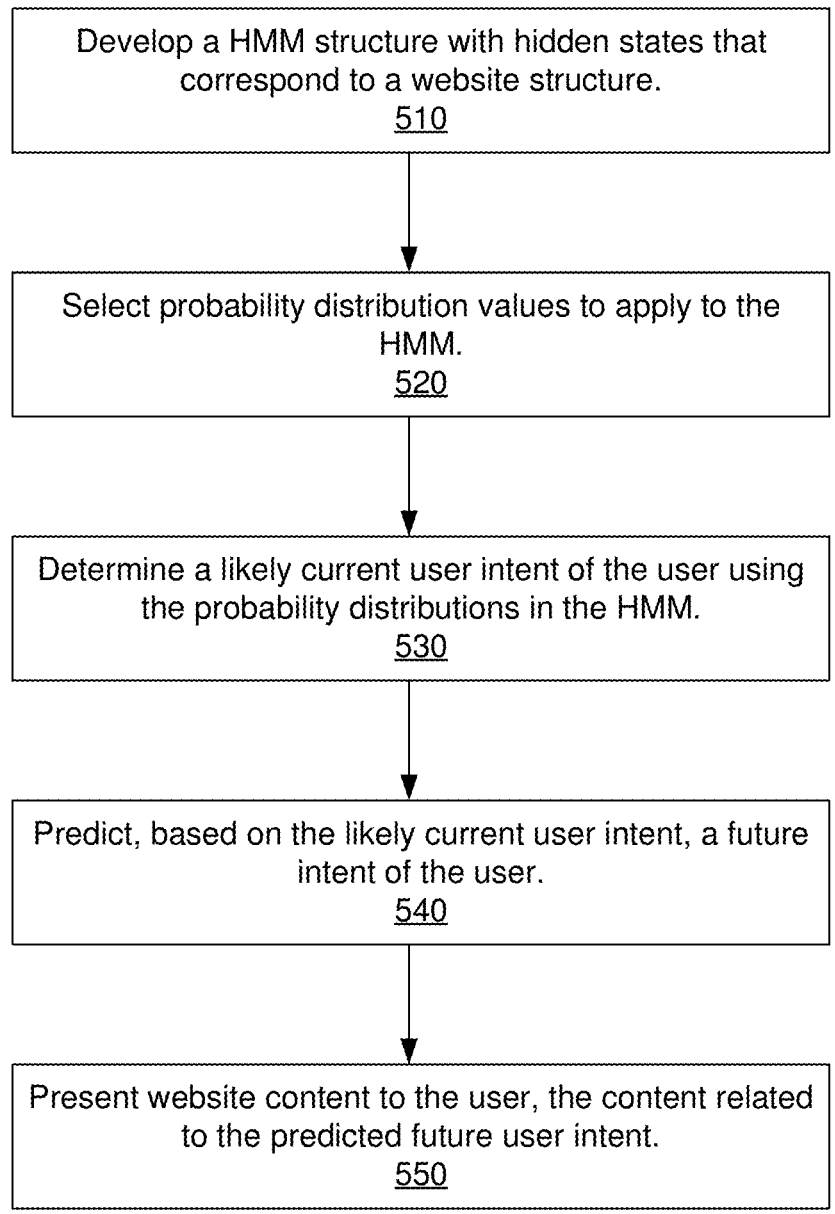
FIG. 5 is a flowchart describing a process for presenting website content in view of a predicted future user intent.

FIG. 5 is a flowchart describing a process for presenting website content in view of a predicted future user intent. The online system develops 510 a HMM structure with hidden states that correspond to the structure of a website. Hidden states of the HMM are representative of possible user intents that have been identified by a machine model or by a system administrator as being possible user intents for the website.

The online system selects 520 probability distribution values to apply to the HMM. Probability distributions for the HMM include values for transition probabilities, emission probabilities, and initial probabilities. The online system may use the Baum-Welch algorithm to develop each of the three types of probability distribution values that may be stored and loaded into a HMM structure when a user accesses the website.

Using the HMM the online system determines 530 a current user intent of a user who has accessed a website. The online system predicts 540 one or more future user intents by applying a Monte Carlo Tree Search or a deterministic algorithm to the structure of the HMM, starting at a state in the HMM that represents the predicted current user intent.

The online system presents 550 website content to the user based on information about the one or more predicted user intents. The online system may change the content that is provided to the user or may change the way that the content is presented, for example, such that the user can more quickly and efficiently access website content associated with a predicted user intent.

Computer Hardware Components

Figure 6:
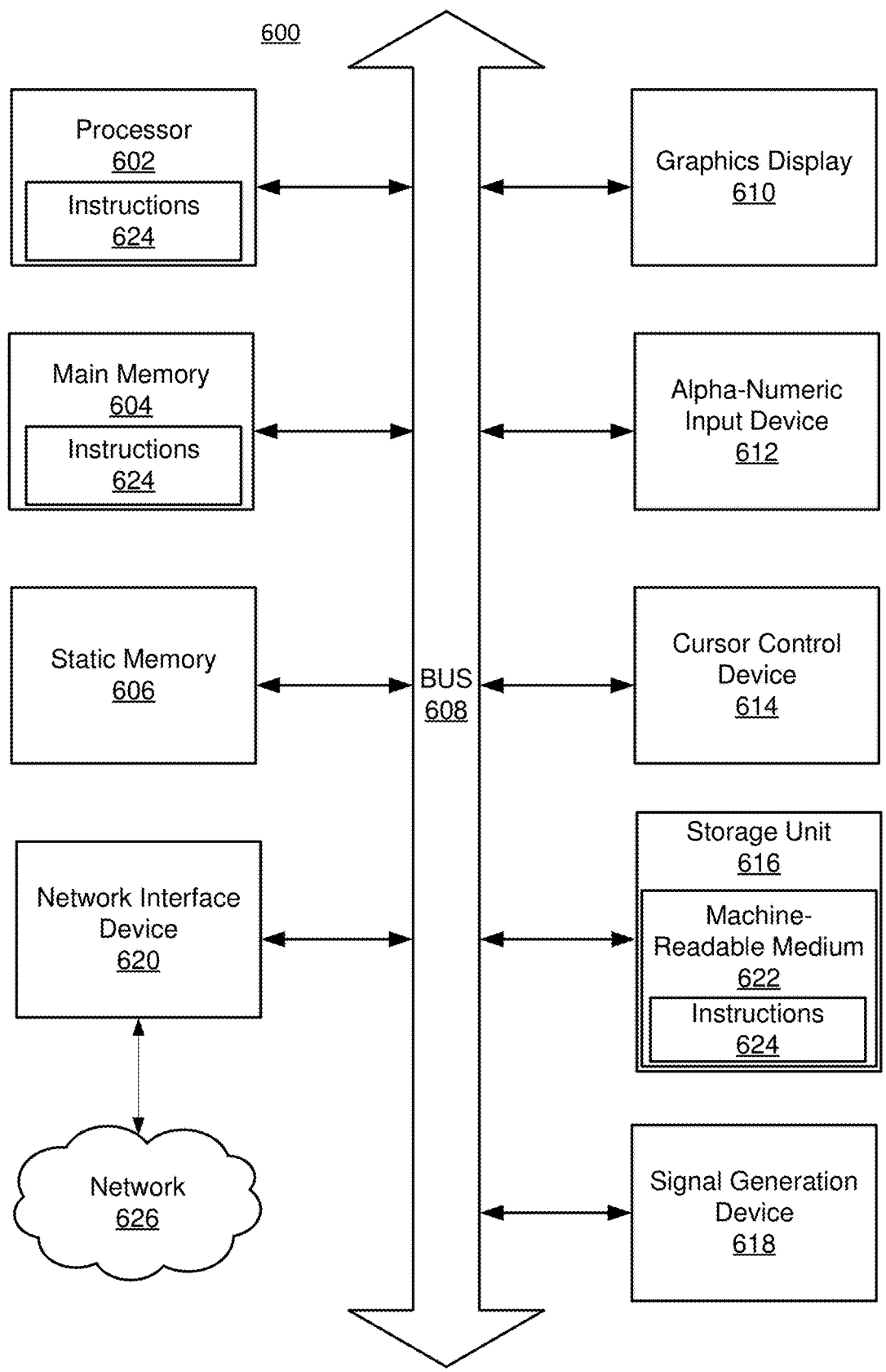
FIG. 6 is a block diagram illustrating components of an example machine able to read instructions from a machine-readable medium and execute them in one or more processors (or controllers).

FIG. 6 is a block diagram illustrating components of an example machine able to read instructions from a machine-readable medium and execute them in one or more processors (or controllers). Specifically, FIG. 6 shows a diagrammatic representation of system 130 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 606 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include instructions for implementing the functionalities of the crawler module 135, the pre-processing module 140, the ranking module 145, the implementation module 150, the profile processing module 155, and the feedback module 160. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but may not be limited to, data repositories in the form of solid-state memories, optical media, and magnetic media.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
creating a content graph of a website of an online system using a crawler module, the content graph comprising a plurality of nodes representing a hierarchical relationship of a plurality of hyperlinks of the website, the crawler module traversing each page of the website via the plurality of hyperlinks to collect one or more observable actions a user can take within each webpage of the website, the one or more observable actions comprising at least one of a hovering, a clicking, or a conversion associated with the plurality of hyperlinks;
tracking the one or more observable actions using a tracking pixel, the tracking pixel being embedded in code of each webpage configured to log the one or more observable actions within each webpage;
determining, using the crawler module, an intent categorization for each of the one or more observable actions, the intent categorization relating to possible intents associated with each of the one or more observable actions;
training, based on the content graph that comprises the plurality of nodes representing the hierarchical relationship of the plurality of hyperlinks of the website and the intent categorization for the one or more observable actions, a Hidden Markov model, the Hidden Markov model corresponding to a state graph that comprises a plurality of nodes connected by a plurality of edges, each node corresponding to a hidden state that represents a possible user intent, each edge corresponding to a probability of transition from a possible user intent of a first connecting node to another possible user intent of a second connecting node;
selecting values for a set of probability distributions based on user attributes stored in a user profile associated with the user;
determining, using the trained Hidden Markov model, a current intent of a user based on values of a plurality of transition probabilities associated with the state graph, the selected values and based on a sequence of actions performed by the user while interacting with the website;
identifying a hidden state associated with the trained Hidden Markov model, the hidden state being associated with the current intent of the user;
determining a future intent of the user by applying a Monte Carlo tree search algorithm to the state graph corresponding to the trained Hidden Markov model starting from the hidden state;
identifying a first webpage of the website based on the future intent of the user; and
presenting a hyperlink to the first webpage of the website within one or more dynamic graphical interface elements to allow the user to perform an action to accomplish the future intent.

2. The computer-implemented method of claim 1, wherein the sequence of actions is a first sequence of actions, wherein the hyperlink to the first webpage of the website is first content of the website, the method further comprising:

identifying, using the tracking pixel, a second sequence of actions performed by the user while interacting with the website, the second sequence of actions corresponding to one or more interactions with the website;

updating the trained Hidden Markov model by adjusting one or more weights of the set of probability distributions based on the second sequence of actions;

determining, using the updated Hidden Markov model, a sequence of future intents of the user based on the second sequence of actions;

identifying second content of the website based on the sequence of future intents of the user; and causing display of the second content of the website on a device associated with the user.

3. The computer-implemented method of claim 1, the selecting values for the set of probability distributions comprising:

loading the values for the set of probability distributions into the trained Hidden Markov model.

4. The computer-implemented method of claim 1 further comprising:

generating the one or more dynamic graphical interface elements within a second webpage of the website; and causing display of the hyperlink to the first website within the one or more dynamic graphical interface elements on a device associated with the user.

5. A non-transitory computer-readable storage medium storing computer program instructions executable by one or more processors of a system to perform steps comprising:

creating a content graph of a website of an online system using a crawler module, the content graph comprising a plurality of nodes representing a hierarchical relationship of a plurality of hyperlinks of the website, the crawler module traversing each page of the website via the plurality of hyperlinks to collect one or more observable actions a user can take within each webpage of the website, the one or more observable actions comprising at least one of a hovering, a clicking, or a conversion associated with the plurality of hyperlinks;

tracking the one or more observable actions using a tracking pixel, the tracking pixel being embedded in code of each webpage configured to log the one or more observable actions within each webpage;

determining, using the crawler module, an intent categorization for each of the one or more observable actions, the intent categorization relating to possible intents associated with each of the one or more observable actions;

training, based on the content graph that comprises the plurality of nodes representing the hierarchical relationship of the plurality of hyperlinks of the website and the intent categorization for the one or more observable actions, a Hidden Markov model, the Hidden Markov model corresponding to a state graph that comprises a plurality of nodes connected by a plurality of edges, each node corresponding to a hidden state that represents a possible user intent, each edge corresponding to a probability of transition from a possible user intent of a first connecting node to another possible user intent of a second connecting node;

selecting values for a set of probability distributions based on user attributes stored in a user profile associated with the user;

determining, using the trained Hidden Markov model, a current intent of a user based on values of a plurality of transition probabilities associated with the state graph, the selected values and based on a sequence of actions performed by the user while interacting with the website;

identifying a hidden state associated with the trained Hidden Markov model, the hidden state being associated with the current intent of the user;

determining a future intent of the user by applying a Monte Carlo tree search algorithm to the state graph corresponding to the trained Hidden Markov model starting from the hidden state;

identifying a first webpage of the website based on the future intent of the user; and presenting a hyperlink to the first webpage of the website within one or more dynamic graphical interface elements to allow the user to perform an action to accomplish the future intent.

6. The non-transitory computer-readable storage medium of claim 5, wherein the sequence of actions is a first sequence of actions, wherein the hyperlink to the first webpage of the website is first content of the website, and wherein the steps further comprise:

identifying, using the tracking pixel, a second sequence of actions performed by the user while interacting with the website, the second sequence of actions corresponding to one or more interactions with the website;

updating the trained Hidden Markov model by adjusting one or more weights of the set of probability distributions based on the second sequence of actions;

determining, using the updated Hidden Markov model, a sequence of future intents of the user based on the second sequence of actions;

identifying second content of the website based on the sequence of future intents of the user; and causing display of the second content of the website on a device associated with the user.

7. The non-transitory computer-readable storage medium of claim 5, the selecting values for the set of probability distributions comprising:

loading the values for the set of probability distributions into the trained Hidden Markov model.

8. The non-transitory computer-readable storage medium of claim 5, wherein the steps further comprise:

generating the one or more dynamic graphical interface elements within a second webpage of the website; and causing display of the hyperlink to the first website within the one or more dynamic graphical interface elements on a device associated with the user.

9. A computer system comprising:

one or more computer processors for executing computer program instructions; and a non-transitory computer-readable storage medium storing instructions executable by the one or more computer processors to perform steps comprising:

creating a content graph of a website of an online system using a crawler module, the content graph comprising a plurality of nodes representing a hierarchical relationship of a plurality of hyperlinks of the website, the crawler module traversing each page of the website via the plurality of hyperlinks to collect one or more observable actions a user can take within each webpage of the website, the one or more observable actions comprising at least one of a hovering, a clicking, or a conversion associated with the plurality of hyperlinks;

tracking the one or more observable actions using a tracking pixel, the tracking pixel being embedded in code of each webpage configured to log the one or more observable actions within each webpage;

determining, using the crawler module, an intent categorization for each of the one or more observable actions, the intent categorization relating to possible intents associated with each of the one or more observable actions;

training, based on the content graph that comprises the plurality of nodes representing the hierarchical relationship of the plurality of hyperlinks of the website and the intent categorization for the one or more observable actions, a Hidden Markov model, the Hidden Markov model corresponding to a state graph that comprises a plurality of nodes connected by a plurality of edges, each node corresponding to a hidden state that represents a possible user intent, each edge corresponding to a probability of transition from a possible user intent of a first connecting node to another possible user intent of a second connecting node;

selecting values for a set of probability distributions based on user attributes stored in a user profile associated with the user;

determining, using the trained Hidden Markov model, a current intent of a user based on values of a plurality of transition probabilities associated with the state graph, the selected values and based on a sequence of actions performed by the user while interacting with the website;

identifying a hidden state associated with the trained Hidden Markov model, the hidden state being associated with the current intent of the user;

determining a future intent of the user by applying a Monte Carlo tree search algorithm to the state graph corresponding to the trained Hidden Markov model starting from the hidden state;

identifying a first webpage of the website based on the future intent of the user; and presenting a hyperlink to the first webpage of the website within one or more dynamic graphical interface elements to allow the user to perform an action to accomplish the future intent.

10. The computer system of claim 9, wherein the sequence of actions is a first sequence of actions, wherein the hyperlink to the first webpage of the website is first content of the website, and wherein the steps further comprise:

identifying, using the tracking pixel, a second sequence of actions performed by the user while interacting with the website, the second sequence of actions corresponding to one or more interactions with the website;

updating the trained Hidden Markov model by adjusting one or more weights of the set of probability distributions based on the second sequence of actions;

determining, using the updated Hidden Markov model, a sequence of future intents of the user based on the second sequence of actions;

identifying second content of the website based on the sequence of future intents of the user; and causing display of the second content of the website on a device associated with the user.

11. The computer system of claim 9, the selecting values for the set of probability distributions comprising:

loading the values for the set of probability distributions into the trained Hidden Markov model.

12. The computer system of claim 9, wherein the steps further comprise:

generating the one or more dynamic graphical interface elements within a second webpage of the website; and causing display of the hyperlink to the first website within the one or more dynamic graphical interface elements on a device associated with the user.

* * * * *

UNITED STATES PATENT AND TRADEMARK OFFICE
CERTIFICATE OF CORRECTION

| | | |
|---|---|---|
| PATENT NO. | : 12,354,029 B2 | Page 1 of 1 |
| APPLICATION NO. | : 15/879351 | |
| DATED | : July 8, 2025 | |
| INVENTOR(S) | : Ning Ma | |

It is certified that error appears in the above-identified patent and that said Letters Patent is hereby corrected as shown below:

In the Specification

In Column 2, Line 13, before "online", insert --the--

In Column 4, Line 57, delete "FIG. 4" and insert --FIG. 4.-- therefor

In Column 4, Line 64, delete "probably" and insert --probable-- therefor

In Column 5, Line 63, delete "web site" and insert --website-- therefor

In Column 9, Line 1, delete "170" and insert --155-- therefor

In Column 9, Line 32, delete "intentsand" and insert --intents and-- therefor

In Column 12, Line 42, delete "606" and insert --600-- therefor

Signed and Sealed this
Tenth Day of February, 2026

John A. Squires
*Director of the United States Patent and Trademark Office*